Patented Aug. 10, 1954

2,686,184

UNITED STATES PATENT OFFICE 2,686,184

PROCESS FOR THE MANUFACTURE OF METAL-FREE PHTHALOCYANINE OF THE β-MODIFICATION

Walter Wettstein, Riehen, Switzerland, assignor to Ciba Limited, Basel, Switzerland, a Swiss firm No Drawing. Application February 4, 1952, Serial No. 269,903

Claims priority, application Switzerland February 7, 1951

14 Claims. (Cl. 260—314.5)

Metal-free phthalocyanines were originally obtained by simple treatment with an acid of an alkali metal or alkaline earth metal phthalocyanine. In this way, in contradistinction to the heavy metal phthalocyanines, it is obtained in a form useful as a pigment, which as shown by X-ray examination is in the so-called α-form or the closely allied γ-form.

Later processes have become known in which metal-free phthalocyanine is obtained directly without the need of first preparing an alkali metal or alkaline earth metal compound. It has, for example, been proposed to heat phthalonitrile with triethanolamine or with an organic oxy-compound, especially a dioxybenzene. The metal-free phthalocyanine obtained in a yield of about 50 per cent. by this process is in the so-called β-modification as shown by X-ray examination, and is obtained in a coarsely crystalline form which cannot be used directly as a pigment dyestuff. These latter processes, as compared with the former processes using alkali metal or alkaline earth metal phthalocyanines as starting materials, have not found application, partly because they give too low a yield or too impure a product, and partly because the auxiliary substances necessary for carrying them out are too costly.

In the Fiat Final Report No. 1313, vol. III, pages 292–293, preference is given to a process which uses calcium phthalocyanine and calls for the subsequent treatment with dilute hydrochloric acid and gives a yield of 60–65 per cent. of the α- or γ-modification. In addition to this process a further process has been used which consists in introducing phthalonitrile into a boiling solution of sodium amylate, whereby sodium phthalocyanine is obtained, which is converted by means of sulfuric acid into metal-free phthalocyanine of the α-modification. If, on the other hand, it is desired to produce the valuable β-modification having a considerably more greenish shade in a form suitable for a pigment dyestuff, that is to say in a dispersible form, for example, by the process of U. S. Patent Application, Serial No. 211,983 filed Feb. 20, 1951, it is advisable to start from a product which is already in the β-form. Accordingly, there is a need for an economical and technically simple process for producing metal-free phthalocyanine of the β-modification.

The present invention which satisfies this need, is based on the unexpected observation that metal-free phthalocyanine of the β-modification can be obtained in a very simple manner by heating an alkali phthalocyanine the alkali metal of which has an atomic weight above 20 with an ammonium salt of a strong acid. In order to keep the reaction temperature low it is of advantage to conduct the heating operation in the presence of an organic solvent. The addition of a solvent also has the advantage that the reaction product is obtained in the form of a mass which is stirrable and easy to handle. The product produced in this manner is obtained in the coarsely crystalline form which cannot be used directly as a pigment dyestuff. It serves as the starting material for producing the valuable metal-free phthalocyanine of the β-modification in a form having a strong coloring power, that is to say, in a dispersible form and therefore valuable as a pigment dyestuff.

As alkali phthalocyanines there may be used the compounds of phthalocyanine with all alkali metals having an atomic weight above 20, but advantageously sodium or potassium phthalocyanine. Mixtures of alkali phthalocyanines with metal-free phthalocyanines, such as are obtained for example by the process of my copending application Serial No. 269,902, filed February 4, 1952, may also be used.

As ammonium salts of strong acids there may be mentioned the ammonium salts of sulfuric acid, hydrochloric acid and phosphoric acid and also of aromatic sulfonic acid, such as e. g. of meta-nitrobenzene sulfonic acid. Ammonium sulfate has been found to be especially suitable. The ammonium salt must be present in a quantity at least sufficient for reaction with the alkali phthalocyanine present, that is to say, for one molecular proportion of alkali phthalocyanine there must be used at least one molecular proportion of ammonium sulfate or two molecular proportions of ammonium chloride. Advantageously an excess of ammonium salt is used, because in this way the reaction proceeds more rapidly.

The temperature of the heating operation may vary within wide limits. The lower the temperature the longer must be the period of heating. It is of advantage to work in the presence of a solvent. The temperature at which the reaction with the ammonium salt begins depends to a great extent on the nature of the solvent and on the degree of dispersion of the dyestuff. In general, alcohols enable the reaction to be carried out at a lower temperature than hydrocarbons. Highly dispersed dyestuffs react at a lower temperature than coarse dyestuffs. The onset of the reaction can be recognized by the evolution of ammonia. The necessary reaction temperature can therefore be easily determined experimentally for any selected solvent. In general the heating should be at a temperature above 100° C., especially at about 160–190° C. The end of the reaction can easily be recognized by the cessation of the evolution of ammonia.

As solvents there are principally used those of which the boiling point is higher than the temperature of the heat treatment. However, solvents boiling below that temperature may be used, but then it is necessary to work under pressure. As solvents there are especially suitable alcohols, which boil above 100° C., such as araliphatic alcohols, for example, benzyl alcohol, phenylethyl alcohol, and also hydroaromatic alcohols such, for example, as cyclohexanol, methylcyclohexanols, and aliphatic alcohols having more than two carbon atoms such, for example, as propanol, butanol, $n$-heptyl alcohol, $n$-octyl alcohol, $n$-decyl alcohol, lauryl alcohol, cetyl alcohol and the like. Alternatively, there may be used as solvents liquid hydrocarbons which are liquid at the reaction temperature. As such hydrocarbons there are suitable those of the aliphatic series having more than 8 carbon atoms, e. g. normal nonane, or mixtures of such hydrocarbons as occurring in a petroleum fraction boiling between 160 and 240° C., and also those of the aromatic or hydroaromatic series such, for example, as xylenes, naphthalene, tetrahydronaphthalene, decahydronaphthalene and the like. There are also suitable derivatives of these hydrocarbons such, for example, as dichlorobenzenes, trichlorobenzenes, $\alpha$-chloronaphthalene, nitrobenzene, and also ethers boiling above 140° C., such e. g. as anisol, phenetol, diphenyl oxide, and the like. Obviously mixtures of the aforesaid solvents may be used. By virtue of the present process all those processes, which lead to metal-free $\alpha$- or $\gamma$-phthalocyanines by way of alkali phthalocyanines, can be used also for the production of metal-free phthalocyanine of the $\beta$-modification, especially the process which reacts phthalonitrile with an alkali metal alcoholate. When an alkali phthalocyanine made by the latter process is used as starting material in the process of the invention in the presence of a solvent, it is of advantage to use the solvent which was used in preparing the alkali phthalocyanine. The alkali phthalocyanine need not be isolated, but can be converted in the reaction mixture by the present process into metal-free phthalocyanine of the $\beta$-modification.

The following examples illustrate the invention, the parts being by weight:

Example 1

1.15 parts of sodium are dissolved in 32 parts of boiling amyl alcohol and 6.4 parts of phthalonitrile are added. The mixture immediately acquires a yellow color and then changes rapidly to deep green, whereupon a lustrous purple colored mass begins to separate out. The mixture is boiled for about ½ hour, and then the dyestuff is separated by filtration and washed with amyl alcohol or propanol or the like.

Instead of purifying this dyestuff and reprecipitating it from sulfuric acid, whereby the $\alpha$-modification would be obtained, there are added to the residue 32 parts of benzyl alcohol and 3.45 parts of ammonium sulfate, and the mass is heated while stirring at 180° C. for 40 minutes. The initially finely crystalline dyestuff becomes coarse-grained. It is separated by filtration at 120° C., washed first with hot ethanol and then with water, and dried at 120° C. The yield is quantitative. The dyestuff consists of metal-free phthalocyanine of the $\beta$-modification, which contains practically none of the $\alpha$-modification.

Example 2

3.5 parts of the sodium phthalocyanine prepared according to the first paragraph of Example 1 are boiled for 5 hours while stirring with 0.7 part of ammonium chloride and 25 parts of trichlorobenzene. The dyestuff is then removed from the solvent by filtration, washed with ethanol or propanol and then with water, and dried. All of the sodium phthalocyanine employed is obtained in the form of pure metal-free phthalocyanine of the $\beta$-modification. The trichlorobenzene can with equal success be replaced e. g. by $\alpha$-chloronaphthalene, a phenol ether, such as for example phenetol, or a higher boiling homologue of benzene, as e. g. xylene. Instead of 0.7 part of ammonium chloride an equivalent quantity, i. e. 3.05 parts of the ammonium salt of meta-nitrobenzene sulfonic acid can be used.

Example 3

1 part of sodium is dissolved in 40 parts of cyclohexanol, 2 parts of phthalonitrile are added, and the whole is heated at the boil for 15 minutes. Instead of isolating the dyestuff and re-precipitating it from sulfuric acid, whereby the $\alpha$-modification would be obtained, 3 parts of ammonium sulfate or secondary ammonium phosphate are added and the mass is maintained at the boil for a further 2 hours. The reaction product is separated by filtering while hot, washed with hot propanol and then with hot water, and dried at 120° C. The product consists of metal-free phthalocyanine of the $\beta$-modification.

Example 4

The cyclohexanol used in Example 3 is replaced by a corresponding quantity of benzyl alcohol, and the procedure is otherwise as described in that example. The reaction of the sodium phthalocyanine with ammonium sulfate to form metal-free phthalocyanine of the $\beta$-modification is completed in about 30 minutes owing to the higher boiling point of benzyl alcohol.

Example 5

The sodium phthalocyanine prepared as described in the first paragraph of Example 1, which contains about 3.5 parts of the pure dyestuff, is heated with 1 part of ammonium chloride for 4 hours at 240° C. After cooling, the dyestuff is washed with hot water and dried. It consists of metal-free phthalocyanine of the $\beta$-modification.

Example 6

A mixture of sodium phthalocyanine and metal-free phthalocyanine, as obtained according to my copending application Serial No. 269,902, filed February 4, 1952, from 125 parts of decahydronaphthalene, 125 parts of benzyl alcohol, 41 parts of phthalonitrile and 2 parts of sodium, is mixed with 6 parts of ammonium sulfate at about 160° C. and the whole heated to 180° C. for another 40 minutes. The dyestuff is then filtered off, washed with ethanol or propanol and then with hot water, and dried. There are thus obtained 26.5 parts of a pure metal-free phthalocyanine of the $\beta$-modification.

By starting from a mixture of potassium phthalocyanine and metal-free phthalocyanine and otherwise proceeding as described in the foregoing paragraph, there is also obtained pure metal-free phthalocyanine of the β-modification.

What I claim is:

1. A process for the manufacture of the metal-free phthalocyanine of the β-modification comprising heating an alkali phthalocyanine the alkali metal of which has an atomic weight above 20 at a temperature within the range of 100 to 200° C. with an ammonium salt of a strong acid.

2. A process for the manufacture of the metal-free phthalocyanine of the β-modification comprising heating sodium phthalocyanine at a temperature within the range of 100 to 200° C. with an ammonium salt of a strong acid.

3. A process for the manufacture of the metal-free phthalocyanine of the β-modification comprising heating an alkali phthalocyanine the alkali metal of which has an atomic weight above 20 at a temperature within the range of 160 to 190° C. with an ammonium salt of a strong acid.

4. A process for the manufacture of the metal-free phthalocyanine of the β-modification comprising heating an alkali phthalocyanine the alkali metal of which has an atomic weight above 20 at a temperature within the range of 160 to 190° C. with an ammonium salt of a strong acid, the heating operation being conducted in the presence of an organic solvent.

5. A process for the manufacture of the metal-free phthalocyanine of the β-modification comprising heating an alkali phthalocyanine the alkali metal of which has an atomic weight above 20 at a temperature within the range of 160 to 190° C. with an ammonium salt of a strong acid, the heating operation being conducted in the presence of an alcohol.

6. A process for the manufacture of the metal-free phthalocyanine of the β-modification comprising heating an alkali phthalocyanine the alkali metal of which has an atomic weight above 20 at a temperature within the range of 160 to 190° C. with an ammonium salt of a strong acid, the heating operation being conducted in the presence of an alcohol having a boiling point higher than the temperature of the heating operation.

7. A process for the manufacture of the metal-free phthalocyanine of the β-modification comprising heating an alkali phthalocyanine the alkali metal of which has an atomic weight above 20 at a temperature within the range of 160 to 190° C. with an ammonium salt of a strong acid, the heating operation being conducted in the presence of an alcohol having a boiling point above 100° C.

8. A process for the manufacture of the metal-free phthalocyanine of the β-modification comprising heating an alkali phthalocyanine the alkali metal of which has an atomic weight above 20 at a temperature within the range of 160 to 190° C. with an ammonium salt of a strong acid, the heating operation being conducted in the presence of an hydrocarbon which is a member of the group consisting of the aliphatic, aromatic and hydroaromatic series.

9. A process for the manufacture of the metal-free phthalocyanine of the β-modification comprising heating an alkali phthalocyanine the alkali metal of which has an atomic weight above 20 at a temperature within the range of 160 to 190° C. with an ammonium salt of a strong acid, the heating operation being conducted in the presence of an hydrocarbon which is a member of the group consisting of the aliphatic, aromatic and hydroaromatic series and has a boiling point above 100° C.

10. A process for the manufacture of the metal-free phthalocyanine of the β-modification comprising heating an alkali phthalocyanine the alkali metal of which has an atomic weight above 20 at a temperature within the range of 160 to 190° C. with an ammonium salt of a strong acid, the heating operation being conducted in the presence of a mixture of an alcohol and an hydrocarbon, the hydrocarbon being a member of the group consisting of the aliphatic, aromatic and hydroaromatic series.

11. A process for the manufacture of the metal-free phthalocyanine of the β-modification comprising heating an alkali phthalocyanine the alkali metal of which has an atomic weight above 20 at a temperature within the range of 160 to 190° C. with an ammonium salt of a strong mineral acid, the heating operation being conducted in the presence of an organic solvent.

12. A process for the manufacture of the metal-free phthalocyanine of the β-modification comprising heating an alkali phthalocyanine the alkali metal of which has an atomic weight above 20 at a temperature within the range of 160 to 190° C. with ammonium sulfate, the heating operation being conducted in the presence of an organic solvent.

13. A process for the manufacture of the metal-free phthalocyanine of the β-modification comprising heating sodium phthalocyanine at a temperature within the range of 160 to 190° C. with ammonium sulfate, the heating operation being conducted in the presence of an organic solvent.

14. A process for the manufacture of the metal-free phthalocyanine of the β-modification comprising heating sodium phthalocyanine at a temperature within the range of 160 to 190° C. with ammonium sulfate, the heating operation being conducted in the presence of benzyl alcohol.

References Cited in the file of this patent

UNITED STATES PATENTS

| Number | Name | Date |
| --- | --- | --- |
| 2,214,454 | Dent | Sept. 10, 1940 |
| 2,485,168 | Rintelman | Oct. 18, 1949 |